Nov. 5, 1940.    U. RAZZABONI    2,220,660
ACCORDION
Filed Jan. 21, 1938    6 Sheets-Sheet 1

INVENTOR:
UMBERTO RAZZABONI
BY Maxwell E. Sparrow
ATTORNEY

Nov. 5, 1940.                    U. RAZZABONI                    2,220,660
                                   ACCORDION
                             Filed Jan. 21, 1938                6 Sheets-Sheet 2

Nov. 5, 1940.  U. RAZZABONI  2,220,660
ACCORDION
Filed Jan. 21, 1938   6 Sheets-Sheet 3

INVENTOR
UMBERTO RAZZABONI
BY Maxwell E Sparrow
ATTORNEY

Nov. 5, 1940.       U. RAZZABONI        2,220,660
ACCORDION
Filed Jan. 21, 1938         6 Sheets-Sheet 4

INVENTOR
UMBERTO RAZZABONI
BY Maxwell E. Sparrow
ATTORNEY

Nov. 5, 1940.  U. RAZZABONI  2,220,660
ACCORDION
Filed Jan. 21, 1938  6 Sheets-Sheet 5

INVENTOR
UMBERTO RAZZABONI
BY Maxwell E. Sparrow
ATTORNEY

Nov. 5, 1940.  U. RAZZABONI  2,220,660
ACCORDION
Filed Jan. 21, 1938   6 Sheets-Sheet 6

INVENTOR
UMBERTO RAZZABONI
BY
Maxwell E. Sparrow
ATTORNEY

Patented Nov. 5, 1940

2,220,660

UNITED STATES PATENT OFFICE 2,220,660

ACCORDION

Umberto Razzaboni, Paris, France

Application January 21, 1938, Serial No. 186,021
In France February 1, 1937

6 Claims. (Cl. 84—376)

In the melody part of known accordions, octave playing (generally the lower octave) is effected by means of additional octave reeds which are brought into action when the accordion requires the octave reed for playing with two (bandonion) or with four (or five) octave reeds. These additional octave reeds increase the weight, the dimensions and the cost of the instrument. Furthermore, the sound of an accordion which is arranged for example for four reeds, is not so clear, when it is playing with three reeds, as that of an accordion specially constructed for this type of playing. Moreover, it is known that the accordion almost entirely comprises reeds which are equal to those of additional octaves which are spaced twelve notes away and serve as the pure note reed of the upper or lower octave note.

On the other hand, known accordions having more than one reed per note are provided with air outlet valves which generally control two or more orifices (pure note reed plus one or two vibrations reeds, or a plurality of pure note reeds) and are controlled by a key; the method of control used does not enable the valves to be completely lifted, to the same height above each orifice.

The present invention has for its object to overcome these drawbacks; its purpose is to provide the instrument with means enabling the same reed to be used either as a pure note reed, or as an octave reed, thereby eliminating the additional octaves (with the exception, if desired, of the last octaves which are not included in the instrument) which reduces the bulk, the weight and the cost of manufacture of the instrument and also improves the sound of same.

Another object of the invention is to provide means for simultaneously or non-simultaneously opening the various air outlet orifices corresponding to the same key, separately and completely, by direct pivoting of the valve, or by sliding or lifting the valves, thereby substantially improving and amplifying the sound of the instrument.

Another object of the invention is to provide means whereby the pure note reed and the vibrations reeds of each note are controlled by separate valves which can be actuated by a single operation together or separately and individually in combination with one or a plurality of other ordinary reeds (not additional) of the instrument. In particular, each pure note reed is isolated and provided with a separate valve which, in addition to being actuated by its own key, can also be actuated by means of a transmission by the key of another note.

Another object is to provide means whereby each key controls the opening of the valves of the pure note reed and of the vibrations reeds of its own note and, by means of a transmission, only the pure note reed of another, the latter reed thus serving for example as a lower octave.

Another object is to divide the lower end of the key into a plurality of parts and to give each part a sphere of action of its own, for example, one of said parts can be connected to the pure note reed and to the actual vibrations reeds of the key, whereas the other parts are connected to pure note reeds and lower and/or upper vibrations reeds of the same row of valves or of other rows. By giving an appropriate independent and adjustable movement to each part of the lower division of the key, the accordion can easily be made to play from one to six reeds and even more.

Another object is to provide a system of registers which enables the key to actuate at will, in addition to the valves of the pure note reeds and of the corresponding vibrations reeds, the valves of the pure note reeds and of the lower and/or upper vibrations reeds of the same row or of other rows.

Another object is to create a device which permits of the selective actuation either of the pure note reed with one or a plurality of associated vibrations reeds, or of the pure note reed with or without its vibrations reeds and the lower or upper octave or any other note, these two combinations of different sounds being obtained by depressing the same key and their selection being effected simply by displacing a sliding member, for example a register which, according to its position, makes operative or inoperative the actuating transmission of the valve which in each case represents the lower or upper octave. Of course, in both combinations, the vibrations reeds can be eliminated by means of a known register or slide bar. With this simplified system, in the accordions having more than one reed per note (pure note reed plus one or a plurality of vibrations reeds), the pure note reed is isolated and receives a separate valve and is actuated sometimes by the key corresponding to the natural note of the pure note reed, sometimes by the key of which the note is generally an octave lower or higher or any other note. In accordions having a single reed (pure note reed) per note, this device also enables the added octaves to be eliminated by the same means.

Another object is to separate or pivot, in the melody part of the instrument, the part of the key which is integral with the keyboard from the part of the key (rod, lever or other connecting member) which goes to the valves; the keyboard of the accordion can thus be folded, swung down or pushed in to facilitate transport.

The accompanying drawings show, by way of example, a number of embodiments of the invention.

The board of an accordion (Fig. 1) is shown with only one row of valves and six valves divided in two. Furthermore the uncovered orifices for two double valves have been shown and a part of the board and of the reed-blocks has been broken away to show the sliding plates 13 and 14 of the registers.

In Figs. 1 to 7, 1 is a part of the valve board of the melody portion of the sound-board of the accordion; 2 are the valves of the pure note reed and of the two vibrations reeds for the latter (in the present description, vibrations reeds are to be understood to be the reed or reeds associated with the pure note reed to amplify the sound); 3 are the valves of the pure note reeds serving as octaves for the upper pure note reed; 4 and 5 are the two orifices of the same reed (4 operating as an octave reed and 5 as a pure note reed); 6 and 7 are the orifices of the two vibrations reeds, 8 the levers of the keys, 9 the levers of the octave valves, 10 the hook which each lever has and which is connected, by actuating same, to the lever of the valve of the lower octave (Fig. 7); 11 is the drive transmission shaft between the levers 8 and the levers 9; 12 are the supports of the transmission shaft, 13 the perforated plate of the registers which slides in the reed-frame so as to close or open the orifice 4. 14 is the sliding plate serving for closing and opening the orifices 6 and 7; 15 and 16 are the bars which slide the plates 13 and 14 and which are controlled by a device within reach of the user's hand; 17 is the button of the key, 18 the pivot of the key; 19 are the reeds of the orifices 6 and 7, 20 the reed of the orifices 4 and 5; 21 is the reed carrier frame.

Figures 1, 2, 3, 4, 5, 6, 7:
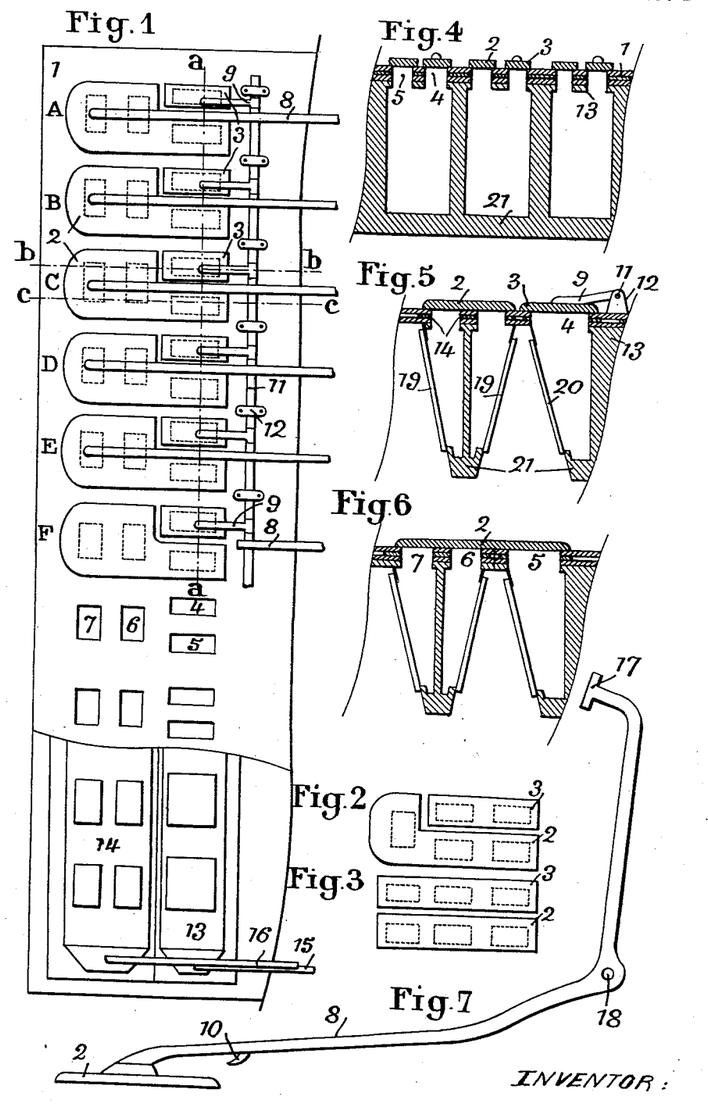
Fig. 1 is a partial plan view of the board.
Figs. 2 and 3 show two modifications.
Figs. 4, 5 and 6 are partial sections of Fig. 1, along the lines a—a; b—b and c—c.
Fig. 7 shows a complete key.
Figures 8, 9, 10, 11, 12:
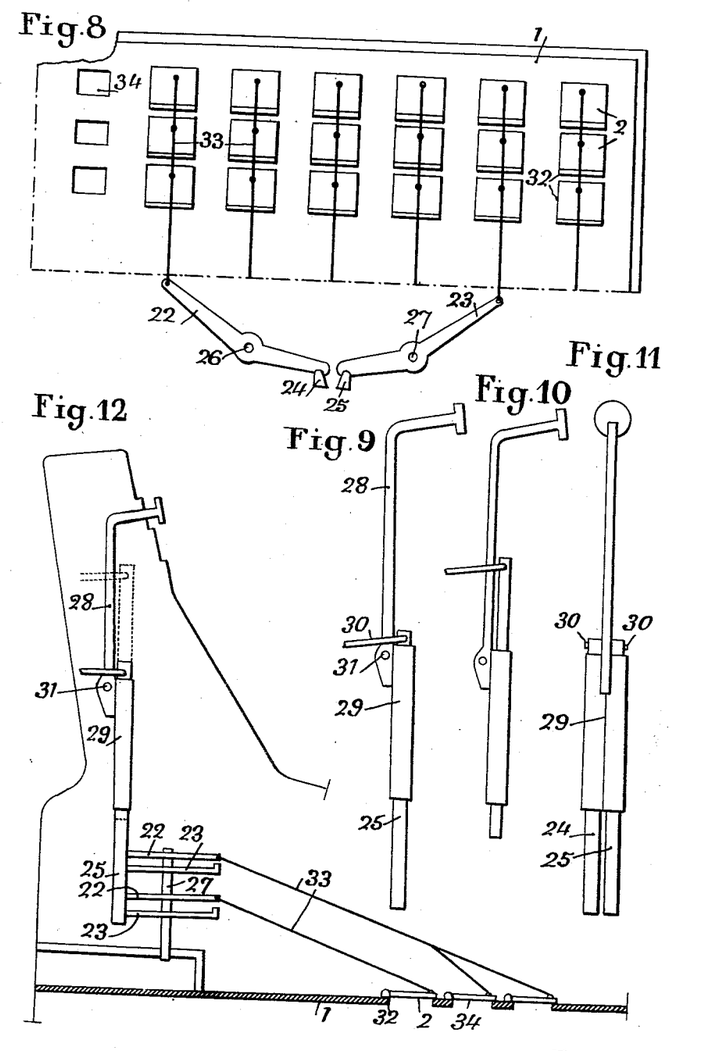
Fig. 8 is a partial plan view of a part of the board according to a modification.
Figs. 9, 10 and 11 show a key seen from the side in two different positions and a rear view.
Fig. 12 shows the key of Figs. 7 to 9 mounted with its mechanism and its valves.

The orifices 6 and 7 each have their own reed, whereas the orifices 4 and 5 have a common reed which, according to whether the valve 2 or the valve 3 is lifted, serves either as a pure note reed, or as an octave reed.

If the button 17 is depressed, the key pivots at 18 and lifts the valve 2; at the same time the rod 8, by means of its hook 10, lifts the valve 3 of the pure note reed serving as the lower octave (pure note reed which is four valves distant). In Fig. 1, the rod of the valve 2 of E also lifts the valve 3 of A, the rod 8 of F acts on the valve 3 of B, etc.

However, as the octave reed is not always required (for example in sonatas with one or three reeds), the orifice 4 is opened and closed by operating the sliding plate 13. The plate 14 serves for closing the orifices 6 and 7 in the case in which the accordion has to play with two reeds (bandonion) or with one reed (pure note), that is to say without vibrations reeds.

Furthermore, the division of the valve which, in the example, is confined to the sole part of the pure note reed (Fig. 1), can also be extended to one or a plurality of vibrations reeds (Figs. 2 and 3).

In Figs. 8 to 12, 1 is the board, 2 are the valves, 22 and 23 the right and left hand levers to which the valves are connected, 24 and 25 the right hand and left hand parts of the lower division of the keys; 26 and 27 are the pivots of the lever 22 and 23. 28 is the upper part of the key, 29 the slide of the key, 30 the junction with the registers, 31 is the pivot of the key, 32 the pivot of the valve, 33 are the connections of the levers and the valves, 34 are the orifices of the reeds.

The two ends 24 and 25 of the key sliding in the slide-way 29 are lowered or raised independently of each other by two registers the ends of which are shown at 30. According to whether the ends 24 and 25 are lowered or raised by means of the register of which the ends are indicated at 30, said ends will include in the sphere of action (in the example illustrated) one, two, three or four levers 22 and 23 (Fig. 12) and precisely one or two with the left hand part (end 24) and one or two with the right hand part (end 25).

If the key which pivots at 31 is actuated, the end or the ends 24 and 25 will push the lever or the levers 22 and 23 which will pivot at 26 and 27, thereby opening one or a plurality of valves 2, said valves 2 pivoting at 32.

A larger number of sliding parts may be provided on each key, the number of levers is unlimited and the desired valves for any musical composition can be actuated (by means of any other arrangement or shape of the ends, of the levers or rods or any other means and of the connections of same). The connection to each other of all the left hand ends of the keys is provided and of all the right hand ends in order to facilitate the actuation of the registers.

Figure 13:
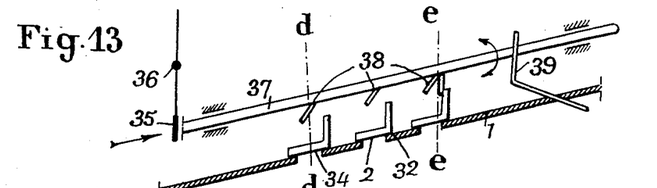
Fig. 13 is a diagrammatical section of a control device for accordion valves according to another embodiment.
Figures 14, 15, 16:
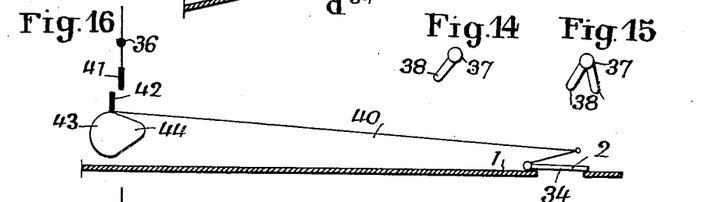
Figs. 14 and 15 are two sections of Fig. 13, along the lines d—d and e—e.
Figs. 16 and 17 show diagrammatically another device for controlling the opening of the valves, seen in the inoperative and the preparation positions.

In Fig. 13, 35 is the lower part of the key which by pivoting at 36, pushes the rod 37 in the direction of the arrow, which rod tends toward its inoperative position. The rod 37 has transverse projections 38, the arrangement of which is shown in Figs. 14 and 15; the rod is rotated by the register 39.

The register 39 rotates the rod 37 and brings one or three projections into register with the valves 2 which open by pivoting at 32, in such a manner that if the rod 37 is displaced axially, the latter displaces with it, according to its position, the connecting portion of one or three valves and opens said valves.

The independent opening of each orifice also enables one or a plurality of orifices to be actuated separately and with another control, in certain cases.

This method of separately opening the orifices in the longitudinal or lateral direction by sliding or by pivoting or by lifting the valves can moreover be applied to any valve, of whatever shape it may be (valve for one or a plurality of orifices per key, valve divided into two, etc.).

The method can, furthermore, be applied to all the other systems illustrated in the present description.

In Figs. 16, 17 and 18, 1 is the board, 2 are the valves, 34 is the orifice of the reed, 32 the pivot point of the valve 2, 41 the lower part of the key which pivots at 36 and has a hook which hooks at 42; 40 is the rod of the valve (or any other connecting means between the lower part of the key and the valve), which is terminated by a hook 42; 43 is a rotating or sliding shaft having eccentrics 44.

Figures 17, 18:
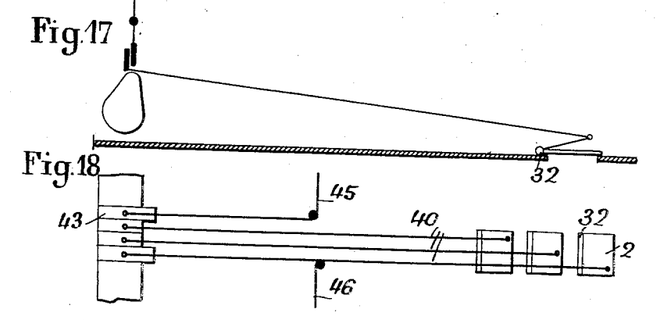
Fig. 18 is a diagrammatical plan view of the previous device.

As seen in Fig. 18, to each eccentric there corresponds a rod 46. The shaft 43, by rotating or by sliding appropriately by means of a register or of any other device, can cause the movement of the key 41 to influence one or a plurality of valves. By means of appropriate connecting means, the action of the key on the valves of the lower and/or upper notes can also be influenced. In the example of Fig. 18, the connecting means 45 is intended to open one or a plurality of valves placed on the left, whereas one of the valves illustrated is opened by the connecting means 46 connected to another key.

Figure 19:
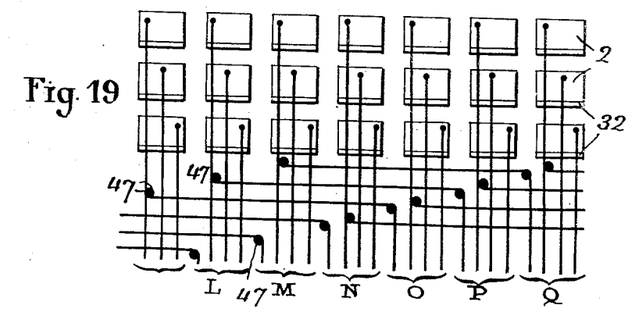
Fig. 19 shows the arrangement of the connections of the valves to the keys according to another embodiment.

Fig. 19 shows an example of an overall view of the opening controls of the valves. The groups of wires L, M, N, O, P and Q are connected to keys. Each key thus opens, by means of countermembers 47 (rollers for flexible cable) either one, two or three valves corresponding to its own reed, or the valve of the pure note reed serving as a lower octave.

In the examples of Figs. 13 to 19, the lower part of the keys is detached from the rod, but the key may also be fixed to the rods. In the cases, however, in which flexible material (wire, etc.) is used for forming the connections for controlling the opening of the valves between the lower part of the key and its valves, the invention provides registers of the type illustrated in Figs. 20 to 23.

Figure 20:
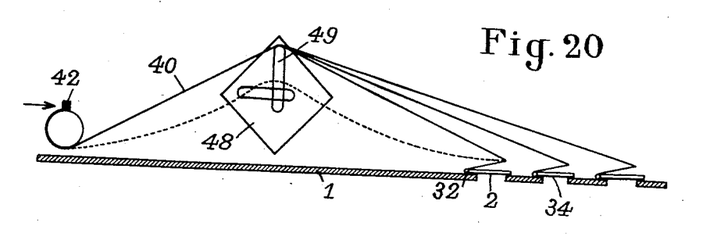
Figs. 20 and 21 are two modifications of the device of Figs. 16 to 19.

Fig. 20 shows a shaft of quadrangular cross-section 48, or of any other cross-section, which rotates or slides or has any other movement. The arrow indicates the point where the lower part of the key pushes the hook 42. By means of the action and the position of combs 49 and according to the position of the shaft 48, the tensioning or the slackening is produced of the wires which control the valves; if the wire is tensioned, the displacement of the movement of the key influences the opening of the valve, whereas if the wire is slack, the displacement of the movement of the key only influences the wire and tensions same, but the valve remains closed.

Figure 21:
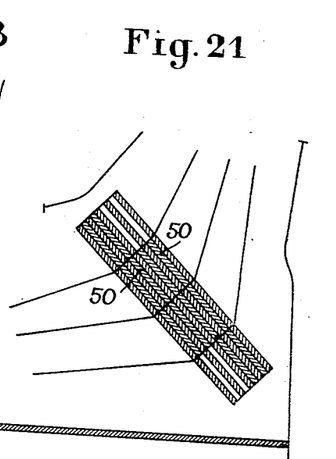
Figure 22:
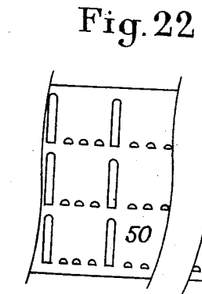
Figs. 22 and 23 are plan views of perforated plates used in the device of Fig. 21.
Figure 23:
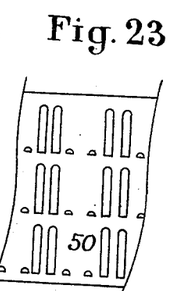

Instead of a rotating shaft, combs (perforated plates 50 for example) can be used which are placed as shown in Fig. 21 or otherwise and move by means of registers, and according to their shape and arrangement, said combs tension or slacken the wires (the continuous portion tensions the wire, the slotted portion does not tension same).

In the modification of Figs. 24 to 27, 51 is a part of the valve board of the sound board of the melody part of the accordion; 52 are the valves of the pure note reeds 53; 54 are the valves of two vibrations reeds 55, 56 associated with the pure note reed of each note.

According to this modification, the valve 54 is connected directly to the key 57 by a bent lever 58, 59 pivoting at 60. The valve 52 is secured to a bent lever 61, 62 pivoting at 63. The free end of the lever 61, 62 normally bears behind the key 57 when the two valves 54 and 52 are both closed or both open. Furthermore, a cross-piece 64 which is secured to a register 65 or is controlled by the latter, can be selectively interposed, by operating said register, between the arm 62 and an arm 66 which is secured to a shaft 67 itself secured to an arm 68 which is placed opposite the valve of the lower octave and can act by means of its hooked end 69 on the lever 61, 62 and lift the valve 52' corresponding to the lower octave. This lifting is effected independently, that is to say without at the same time lifting the corresponding valve 54' of the vibrations reed. The cross-piece 64 may also be pivoted on the arm 59 and be moved away by the action of the register by pivoting about the arm 59.

With this construction, a part of the valves and of the rods is secured to the board, that is to say the valves 52, the lever 61, 62, the mechanism for opening the octave valves, whereas another part, that is to say the valve 54, the rod 58, 59, the key 57, the cross-piece 64, the register 65 and their pivots are secured to the keyboard.

This arrangement enables the keyboard to be removed and same to be mounted separately, and again in the piano system accordions, it enables, by constructing the rod 58, 59 so that it can be folded, or in two parts, the keyboard to be folded as already stated.

A transmission 64, 66, 67, 68, 69 is constructed in the manner described between each key 57 (or the arm 62 actuated by said key) and the arm 61 of the valve 52 of its lower octave, and of course it can be designed for any other combination, with one or a plurality of other notes, that is to say for playing thirds, fourths, fifths, etc.

Figure 24:
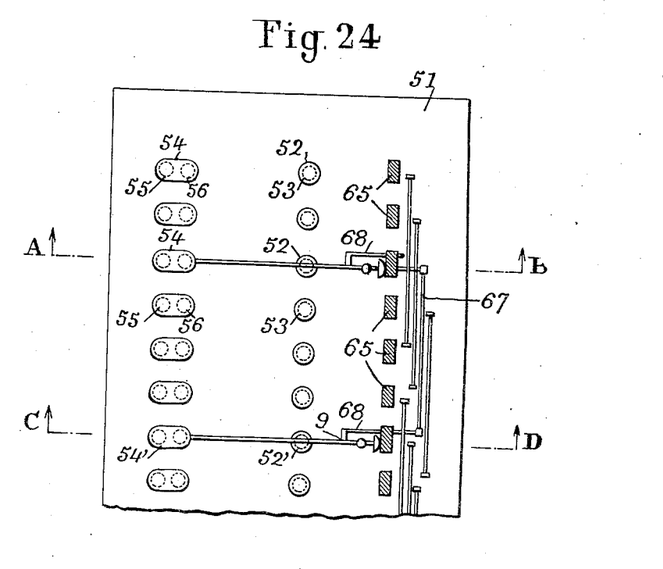
Fig. 24 is a partial diagrammatical plan view of the board of an accordion, in which the orifices of the reeds are provided.
Figure 25:
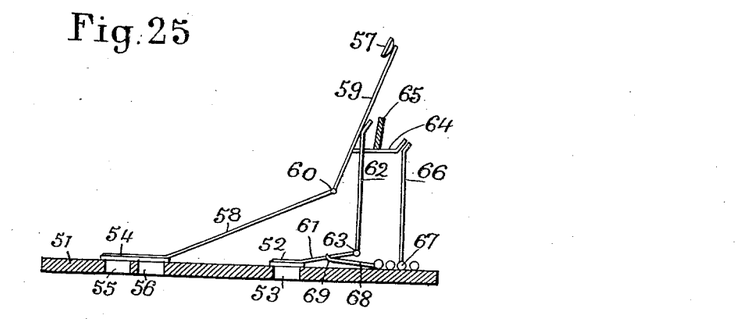
Fig. 25 is a transverse sectional elevation along the line A—B of Fig. 24 (looking in the direction of the arrows), showing the valves closed.
Figure 26:
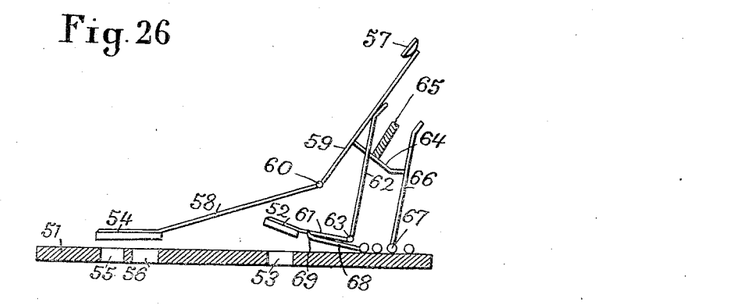
Fig. 26 is a similar view to Fig. 25, but with the valves open.
Figure 27:
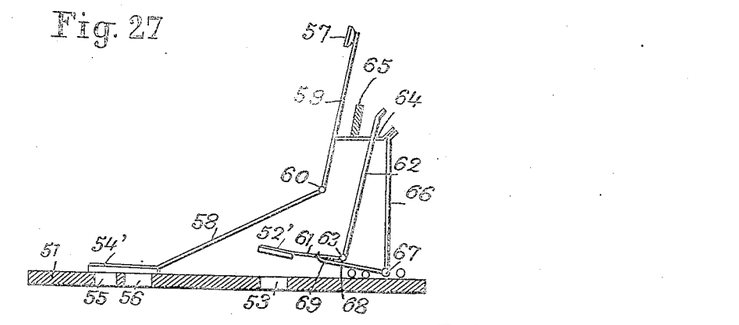
Fig. 27 is a transverse sectional elevation along the line C—D of Fig. 24 (seen in the direction of the arrows), showing the opening of the valve controlled by the opening of the valves of Fig. 26 and the reed of which forms the lower octave of the reed of this figure.

In Fig. 24, for greater clearness, I have diagrammatically shown a board having a single row of reeds and only one set of two reed mechanism, but it is obvious that the invention is not limited to this arrangement and in practice a plurality of rows of reeds or keys could be used. Similarly, at the end of the keyboard where it is not possible to use as octaves, pure note reeds existing in the instrument, the necessary octave reeds can be added.

Figure 28:
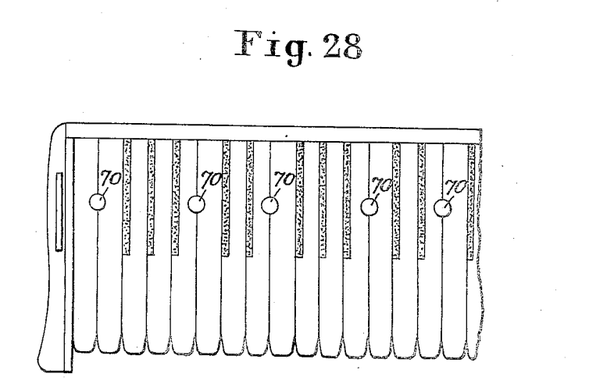
Fig. 28 is a partial plan view of an accordion keyboard (piano system) showing the arrangement in said keyboard of control members for the sliding registers.

Fig. 28 illustrates an accordion keyboard showing the arrangement, in recesses of the keys, of push-buttons 70 serving to actuate the register 65 by means of any suitable transmission, for example by means of a bent lever which transforms the vertical movement imparted to the push-button 70 into a horizontal movement of the register 65.

The device described operates as follows:

When the accordion player wishes to accompany the notes produced by the pure note reeds 53 and the respective vibrations reeds 55, 56 associated with said pure note reeds, with the lower octave (for example in the case of the chromatic accordion the fourth reed) he pushes the register 65 so as to bring the cross-piece 64 between the arms 66 in order to secure them together (position shown in the drawings). In this case, when the accordion player depresses the key 57 of a note by pushing same he simultaneously lifts the valve 52 of the corresponding pure note reed 53 by means of the bent lever 61, 62, the key bearing on the free end of the arm 62, then the valve 54 of the vibrations reeds 55, 56 associated with the pure note reed 53, by means of the bent lever 58, 59, the key 57 being secured to the upper end of the arm 59, and finally the valve 52' of the pure note reed of the lower octave by means of the push imparted in a clockwise direction by the arm 62 to the cross-piece 64 which transmits same to the arm 66, thereby imparting an angular movement to the shaft 67 which, through the instrumentality of the arm 68 and of its hook 69, lifts the arm 61 which is secured to the valve 52', this latter therefore lifts and causes the arm 62 to rotate about its pivot 63, said arm 62 thus moving away from the respective key 57, so that as this latter is not urged in any way it remains stationary and consequently does not lift the valve 54' of the respective vibrations reeds which therefore do not operate. The accordion player consequently obtains, by simply depressing a key 57, the desired combination of sounds viz.: those of the pure note reed of the selected note, of the vibrations reeds associated with said note and of the pure note reed alone of the lower octave note.

On the other hand, if the accordion player wishes to play with only three reeds per note (bal musette) the pure note reed of each note with its associated vibrations reeds, he pushes or pulls the register 65 so as to retract the crosspieces 64, so that when he depresses a key 57, he only displaces the arms 59 and 62 and the members which are secured to same, but no longer reaches the arm 66; as this latter remains stationary it does not transmit any movement to the lower octave which remains dumb.

He can moreover eliminate the two vibrations reeds by means of the usual register and in this case only the pure note reed alone or the pure note reed accompanied only by the octave.

The register or registers serving to place the transmissions provided between each note mechanism and the lower or upper octave note can be rationally arranged, chiefly in piano accordions, so as to be controlled on the actual keyboard of the instrument or on its lateral parts instead of placing the control members above, below or on the back of the keyboard.

Although this embodiment of the invention has been illustrated describing the lifting of the valve of a pure note reed taken as an octave, that is to say the isolation of said reed, it is obvious that the invention could be applied to isolate one or a plurality of vibrations reeds or any other reeds of the instrument by utilizing the same means.

As the control mechanisms of the valves of each note are all connected to their lower octave (or upper octave if desired, or to any other note), in fact four or more than four shafts 67 or other transmission members pass behind each mechanism. Said shafts have been shown diagrammatically as being arranged in a horizontal plane for the convenience of illustration.

Figure 29:
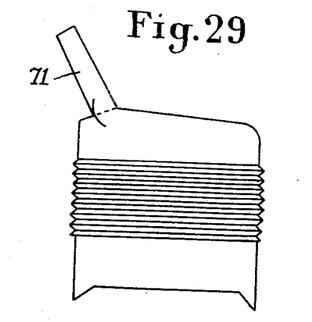
Figs. 29 and 30 are side views of an accordion, the keyboard being in the position for use and in the folded position.
Figure 30:
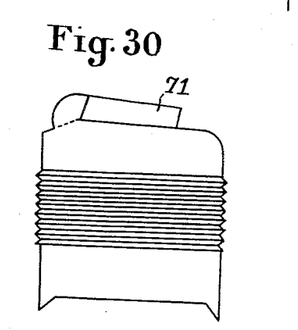

Figs. 29 and 30 show an accordion which exhibits an advantageous feature of the invention; according to this feature, the mechanisms of the keys of the melody part are suitably detached or pivoted, thereby enabling the keyboard 71 to be folded, swung down or removed without in any way touching the valves or the connections of same with the lower parts of the keys.

The constructions illustrated are only examples of embodiments of the principle on which the invention is based and numerous modifications can consequently be made without exceeding the scope of the invention which covers any transmission interposed between the key controlling the valve or valves of a given note or the valve or valves of a non-added lower octave or a non-added upper octave or of another even an ordinary non-added note of the instrument, in order to enable said valves to be actuated by a single pressure exerted on a key, according to the fundamental inventive idea.

I claim:

1. In a musical instrument of the type described, the combination of a plurality of note systems including each a pure note reed and at least two vibration reeds, a valve for operating said pure note reed, another valve for operating said vibration reeds, a keyboard including a key for each of said note systems, means operative by said keys for simultaneously operating the two valves of each note system, means for selectively connecting the first mentioned valve of a note system with the means for simultaneously operating the two valves of another note system corresponding to the octave of the first note, the keys and their connections with the second mentioned valves being detachable from the means for actuating the first mentioned valves.

2. In a musical instrument of the type described, the combination of a plurality of note systems including each a pure note reed and at least two vibration reeds, a valve for operating said pure note reed, another valve for operating said vibration reeds, a keyboard including a key for each of said note systems, means operative by said keys for simultaneously operating the two valves of each note system, means for selectively connecting the first mentioned valve of a note system with the means for simultaneously operating the two valves of another note system corresponding to the octave of the first note system.

3. In a musical instrument of the type described, the combination of a plurality of note systems including each a pure note reed and at least two vibration reeds, a valve for operating said pure note reed, another valve for operating said vibration reeds, a keyboard including a key for each of said note systems, a rigid connection between each key and each vibration valve, a free bearing of said key against the means which actuates the pure note valve, a retractable cross member actuatable by said key, a transmission between said cross member and the actuating means of the valve controlling the pure note reed alone of another note.

4. In a musical instrument of the type described, the combination of a plurality of note systems including each a pure note reed and at least two vibration reeds, a valve for operating said pure note reed, another valve for operating said vibration reeds, a keyboard including a key for each of said note systems, a bent lever connecting each key with the vibration valve of its note, a pivot for said bent lever, a bent lever supporting the pure note valve of said note, a transverse shaft on which the latter bent lever is mounted, the first bent lever bearing freely against the second bent lever, retractable coupling means between said first bent lever of a note and a transmission actuating the transverse shaft on which is mounted the bent lever of the pure note valve of another note.

5. In a musical instrument of the type described, the combination of a plurality of note systems including each a pure note reed and at least two vibration reeds, a valve for operating said pure note reed, another valve for operating said vibration reeds, a keyboard including a key for each of said note systems, a bent lever connecting each key with the vibration valve of its note, a pivot for said bent lever, a bent lever supporting the pure note valve of said note, a transverse shaft on which the latter bent lever is mounted, the first bent lever bearing freely against the second bent lever, a cross-piece interposed between the second named bent lever and an arm secured to a transverse shaft on which is mounted the actuating member of the bent lever of the pure note valve of another note, a register to put said cross-piece selectively into operation.

6. A combination according to claim 5, further including on said actuating member a hooked end engaging the bent lever of the associated pure note valve.

UMBERTO RAZZABONI.